2 Sheets—Sheet 1.

J. BARNES.
HARVESTER-RAKE.

No. 172,952. Patented Feb. 1, 1876.

WITNESSES
H. H. Young
E. C. Davidson

INVENTOR
John Barnes
By his Attorney
W. D. Baldwin

2 Sheets—Sheet 2.

J. BARNES.
HARVESTER-RAKE.

No. 172,952. Patented Feb. 1, 1876.

WITNESSES
H. H. Young
E. C. Davidson

INVENTOR
John Barnes
By his Attorney
Wm. D. Baldwin.

UNITED STATES PATENT OFFICE.

JOHN BARNES, OF ROCKFORD, ILLINOIS, ASSIGNOR OF ONE-HALF HIS RIGHT TO RALPH EMERSON AND WILLIAM A. TALCOTT, OF SAME PLACE.

IMPROVEMENT IN HARVESTER-RAKES.

Specification forming part of Letters Patent No. 172,952, dated February 1, 1876; application filed October 21, 1874.

*To all whom it may concern:*

Be it known that I, JOHN BARNES, of Rockford, in the county of Winnebago and State of Illinois, have invented certain new and useful Improvements in Harvester-Rakes, of which the following is a specification:

My invention relates to a continuously-revolving combined rake and reel of that class in which a series of reel-arms carrying reel-ribs or beaters, and a rake arm or arms provided with a rake-head after having, respectively, pressed the grain back to the cutters and upon the platform, and swept it therefrom, are caused to assume an upright position in their traverse to the points at which they descend to act upon the grain, the movement of the rake being such as to prevent the combing of the standing grain.

My invention constitutes an improvement on the harvester-rake shown in Letters Patent of the United States, No. 85,723, granted to me January 12, 1869. My improvements are, however, equally applicable to almost any of the harvesters of the present day, whether one or two wheeled, front or rear cut, or with jointed or rigid finger-beams.

The subject-matter claimed will hereinafter be set forth, and is illustrated in the best form now known to me in the accompanying drawings, in which—

Figures 1, 2:
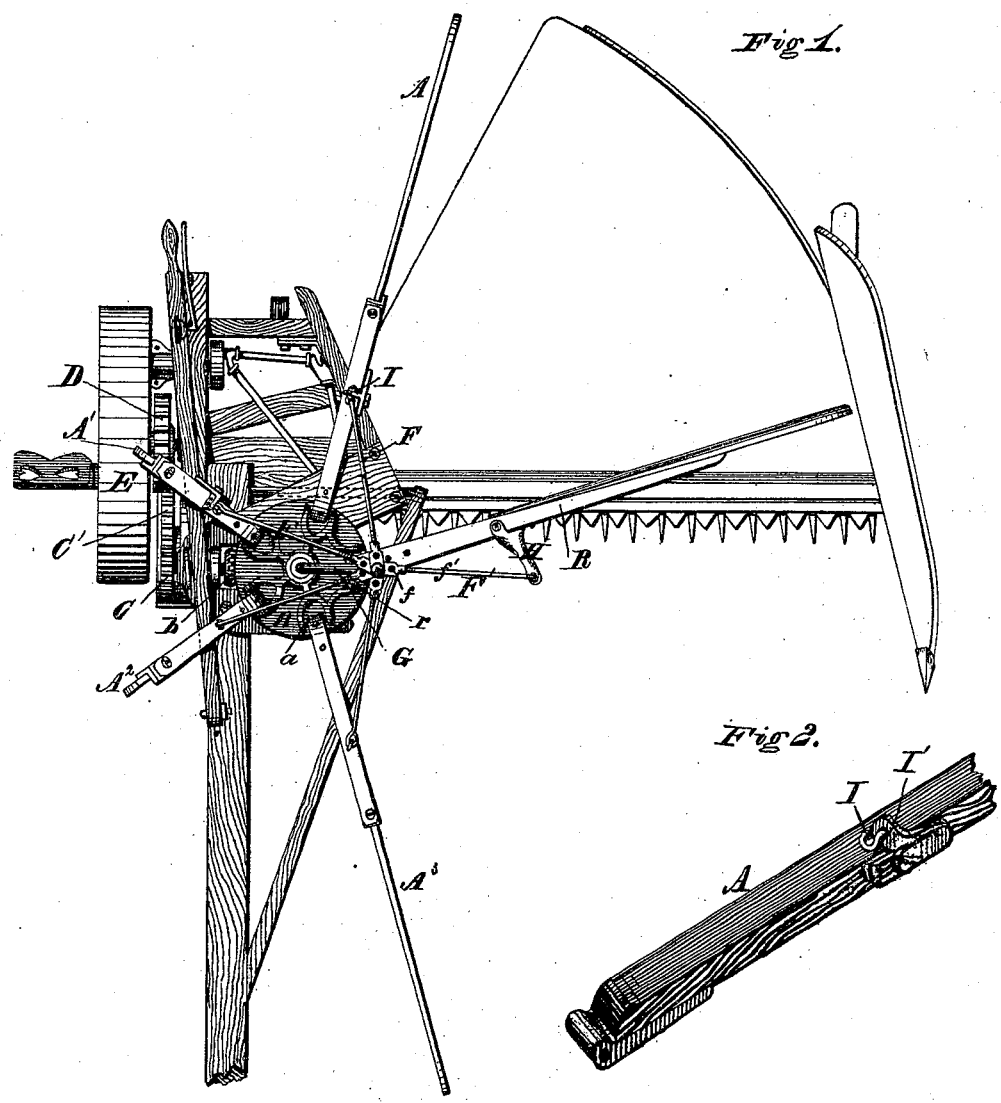
Figure 3:
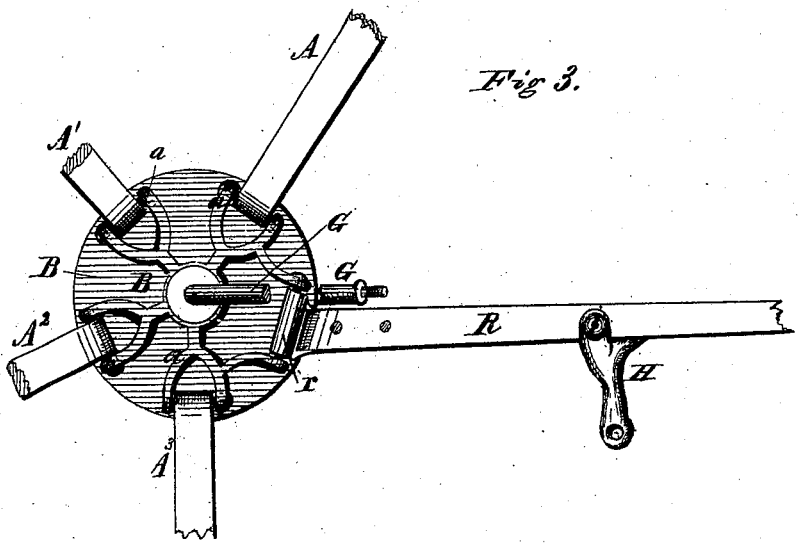
Figure 4:
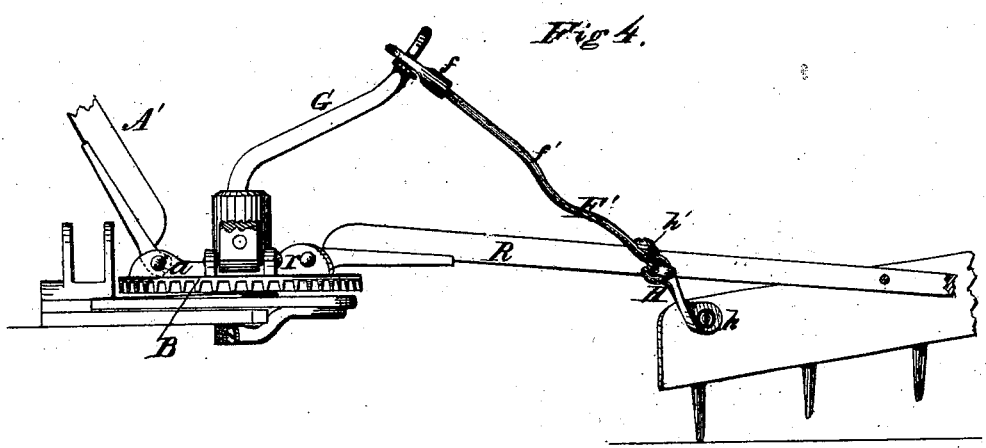

Figure 1 represents a plan or top view of so much of a harvester embracing my improvements as is necessary to illustrate the invention herein claimed; Fig. 2, a view, in perspective, of a portion of one of the reel-arms with its swivel-link and adjustable bracket; Fig. 3, a plan or top view of the hub to which the rake and reel arms are hinged, showing a portion of the rake-arm with its bracket; and Fig. 4, a front elevation of portions of the rake mechanism with the rake in the act of descending upon the platform.

Reel-arms A A¹ A² A³ are pivoted at their inner ends in lugs or sockets $a$ on a revolving hub, B, in such manner as to allow them freely to rise and fall at their outer ends. The hub B is provided with teeth meshing with a pinion, $b$. Motion is communicated to the hub, in this instance, by means of a pinion, C, fast on the same shaft with the pinion $b$, which pinion C engages with a corresponding pinion, C', driven by a spur-wheel, D, loose on the axle of the driving-wheel E, and connected with the driving-wheel by a clutch, so as to be thrown out of action as the machine backs. The wheel D may be thrown into and out of gear with the pinion C', as desired. Any other suitable well-known method of driving the rake and reel may be substituted for that herein described. The rake-arm R is pivoted on the hub B similarly to the reel-arms. Both the rake-arm and the reel-arms are connected, by link-rods F F', with the upper end of a guide-post, G, similar to that shown in my patent of January 12, 1869, before mentioned, and mechanism such as therein described, is, by preference, provided to oscillate and adjust the post. The link-rods F F' are preferably made in sections $ff'$, provided with male and female screw-threads, by which the sections are united, and by which the rods may be lengthened or shortened to adjust the rake and beaters.

To adjust the link-rods without detaching them from the reel-arms, or removing them from the guide-post, where they may be confined by a screw-cap on the end of the post, they are connected with the arms by universal joints, formed by links I swiveled in brackets I' on the reel-arms, thus admitting of the rods being turned to screw them in or out. These brackets I', it will be seen by reference to Fig. 2, are secured to the reel-arms by a slot and set-screw, which allow of the adjustment of the brackets upon the arms when desired.

The rake-arm R, instead of projecting radially from the hub B, as the reel-arms do, is secured to a hinge, $r$, inclined backward at an angle of about fifty-five degrees to the axis or pivot on the hub, (see Fig. 3,) for a purpose hereinafter described. The link-rod F', which connects the rake-arm with the guide-post G, is fitted loosely on the guide-post at one end, while the other, instead of being attached directly to the rake-arm, is linked to an arm or bracket, H, projecting laterally in advance of the rake-arm near its center, which bracket is in this instance forked, so as not only to connect the link and rake-arm, but also to connect and brace the rake-arm and rake-head, one of its branches, $h$, being attached to the rake-head, while the other, $h'$, is attached to the rake-arm. Owing to the location of the rake-arm hinge, nearly in front of, and inclined relatively to, a radial line drawn through the hub parallel with the finger-beam, and to the corresponding obliquity or backward inclination of the rake-arm, it is brought nearer to the beater or gathering arm, which precedes, than to the one which follows it; consequently it has a farther backward sweep than it would have if set radially on the hub. By attaching the link connecting the rake-arm and guide-post to the bracket in advance of the rake-arm—that is, on its front side relatively to the cutters when it is sweeping the grain off the platform—I am enabled to sweep the grain well back without lifting the beater following the rake-arm above the grain, which was a defect incident to the construction, shown in my patent of 1869, above mentioned. By attaching the rake-arms to the revolving hub, in the manner described, I am also enabled to locate the hub sufficiently in advance of the finger-beam to bring the beaters into action well in advance of the cutters, and press the grain squarely in to be cut, the beaters assuming a position parallel to the finger-beam some distance in front of it. The rake-head does not descend into the grain so far in front of the platform as do the reel-ribs, and the combing of the standing grain by the rake-head is avoided. The rake descends slighly in advance of the cutters into a position parallel therewith, and begins to act upon the cut grain upon the platform to sweep it therefrom at its outer end first.

I have shown my improvements as applied in connection with an oscillating guide-post, but they obviously may be used with good effect in connection with a stationary post, the result of which application would be that the sweep of the rake over the platform would be of less extent; but by locating the rake and reel-hub farther back upon the machine, the sweep of the rake could be increased to some extent.

Letters Patent No. 114,094, granted to me April 25, 1871, illustrate an apparatus in which a fixed guide-post is combined with rake and reel arms by links.

I claim as of my own invention—

1. The combination, substantially as hereinbefore set forth, of the following instrumentalities: a revolving hub, a rising and falling rake-arm hinged thereto and projecting therefrom obliquely to a radial line drawn through the hub, a guide-post, a bracket projecting laterally from the rake-arm, and a link connecting the guide-post and bracket, for the purposes specified.

2. The combination of a guide-post, the revolving hub, the reel-arms pivoted thereon, the rake pivoted obliquely on the hub, the bracket on the rake-arm, and the links connecting the guide-post with the rake and reel arms, these members being constructed and operating substantially as hereinbefore set forth.

3. The combination of the guide-post and reel-arms, by means of the adjustable bracket and swivel-link, constructed as described, to adjust the reel-arms.

4. The combined brace and bracket connecting the rake-arm and rake-head, and constructed as described, for the attachment of the link which connects the guide-post and rake-arm.

In testimony whereof I have hereunto subscribed my name.

JOHN BARNES.

Witnesses:
  JOE I. PEYTON,
  E. C. DAVIDSON.